(12) United States Patent  (10) Patent No.: US 8,628,380 B2
Yang  (45) Date of Patent: Jan. 14, 2014

(54) DIRECT MOTOR-DRIVE PORTABLE ANGLE GRINDER

(76) Inventor: Tai-Her Yang, Dzan-Hwa (TW)

( * ) Notice: Subject to any disclaimer, the term of this patent is extended or adjusted under 35 U.S.C. 154(b) by 496 days.

(21) Appl. No.: 12/458,479

(22) Filed: Jul. 14, 2009

(65) Prior Publication Data

US 2011/0014856 A1 Jan. 20, 2011

(51) Int. Cl.
  *B24B 27/08* (2006.01)
(52) U.S. Cl.
  USPC ........... 451/354; 451/358; 451/359; 451/449; 451/451
(58) Field of Classification Search
  USPC ......... 451/344, 354, 356, 357, 358, 359, 449, 451/451
  See application file for complete search history.

(56) References Cited

U.S. PATENT DOCUMENTS

| | | | | |
|---|---|---|---|---|
| 3,520,090 A | * | 7/1970 | Lee | 451/357 |
| 4,791,694 A | * | 12/1988 | Itaya et al. | 15/97.1 |
| 5,201,146 A | * | 4/1993 | Fushiya | 451/358 |
| 5,206,967 A | * | 5/1993 | Fushiya et al. | 15/97.1 |
| 5,349,785 A | * | 9/1994 | Nickels et al. | 451/357 |
| 6,503,133 B2 | * | 1/2003 | Wuensch | 451/357 |
| 7,108,593 B2 | * | 9/2006 | Janson | 451/357 |
| 7,115,018 B1 | * | 10/2006 | Syverson | 451/6 |
| 7,318,768 B2 | * | 1/2008 | Deshpande et al. | 451/5 |
| 7,517,276 B2 | * | 4/2009 | Kuragano et al. | 451/359 |
| 2002/0031992 A1 | * | 3/2002 | Clowers et al. | 451/357 |
| 2002/0106982 A1 | * | 8/2002 | Wuensch | 451/357 |
| 2003/0228833 A1 | * | 12/2003 | Boyer | 451/344 |
| 2007/0079980 A1 | * | 4/2007 | Kononenko et al. | 173/90 |
| 2008/0011102 A1 | * | 1/2008 | Schell et al. | 73/862.22 |

* cited by examiner

*Primary Examiner* — Timothy V Eley
(74) *Attorney, Agent, or Firm* — Bacon & Thomas, PLLC (57) ABSTRACT

The present invention is an original direct motor-drive portable angle grinder with a disc type motor installed in a position adjacent to the grinding wheel and an outer motor rotating part coaxially and directly driving the grinding wheel. By means of the direct drive, the present invention prevents the emission of noise made by angle type transmission devices. Moreover, an inertial body is installed on the rotating housing that is integrated with the rotating part to form a flywheel or the rotating housing and the inertial body are integrated into a single reinforced structure to enable a flywheel function in order to improve the grinding, polishing and machining or cutting abilities of the grinding wheel.

15 Claims, 6 Drawing Sheets

DIRECT MOTOR-DRIVE PORTABLE ANGLE GRINDER

BACKGROUND OF THE INVENTION (a) Field of the Invention

The present invention relates to a direct motor-drive portable angle grinder with a disc type motor installed in a position adjacent to the grinding wheel and an outer motor rotating part coaxially and directly driving the grinding wheel. By means of the direct drive, the present invention prevents the emission of noise made by angle type transmission devices. Moreover, an inertial body is installed on the rotating housing that is integrated with the rotating part to form a flywheel or the rotating housing and the inertial body are integrated into a single reinforced structure to enable a flywheel function in order to improve the grinding, polishing and machining or cutting abilities of the grinding wheel. Aside from a manually controlled electromechanical device, a power storing and discharging device is also installed in the handle for use as a power source.

(b) Description of the Prior Art

Traditional motor-driven right-angle type portable grinder is an electrical tool designed according to ergonomics. Its structural features are the following:

(1) The angular difference between the handle axis extending from the housing and the grinding wheel axis is between 30° and 150°;

(2) The electric motor is installed in the handle;

(3) An angle type transmission device such as a bevel gear set is present in between the grinding wheel spindle and the handle motor spindle;

Because the above structure necessitates an angle type transmission device; hence its deficiency is its very loud noise.

SUMMARY OF THE INVENTION

The present invention is an original direct motor-drive portable angle grinder with a disc type motor installed in a position adjacent to the grinding wheel and an outer motor rotating part coaxially and directly driving the grinding wheel. By means of the direct drive, the present invention prevents the emission of noise made by angle type transmission devices. Moreover, an inertial body is installed on the rotating housing that is integrated with the rotating part to form a flywheel or the rotating housing and the inertial body are integrated into a single reinforced structure to enable a flywheel function in order to improve the grinding, polishing and machining or cutting abilities of the grinding wheel. Aside from a manually controlled electromechanical device, a power storing and discharging device is also installed in the handle for use as a power source.

DESCRIPTION OF MAIN COMPONENT SYMBOLS (100): Drive motor
(150): Commutator-type drive motor
(151): Commutator-type drive motor static part
(152): Commutator-type drive motor rotating part
(153): Commutator
(154): Brush assembly
(160): Brushless motor
(161): Brushless motor static part
(162): Brushless motor rotating part
(200): Motor rotating part
(201): Rotating housing
(202): Commutator type motor magnetic field structure
(205): Motor static part
(206): Motor winding
(210): Fin structure
(250): Vent
(300): Motor spindle
(400): Housing
(500): Handle
(600): Electric brush
(700): Insulation
(800): Grinding wheel
(900): Blades
(1000): Inertial body
(1100): Guard
(1200): Power storing and discharging device
(1300): Control circuit
(1400): Manually operated electromechanical device
(1500): Power cord

DETAILED DESCRIPTION OF THE PREFERRED EMBODIMENTS

Figure 1:
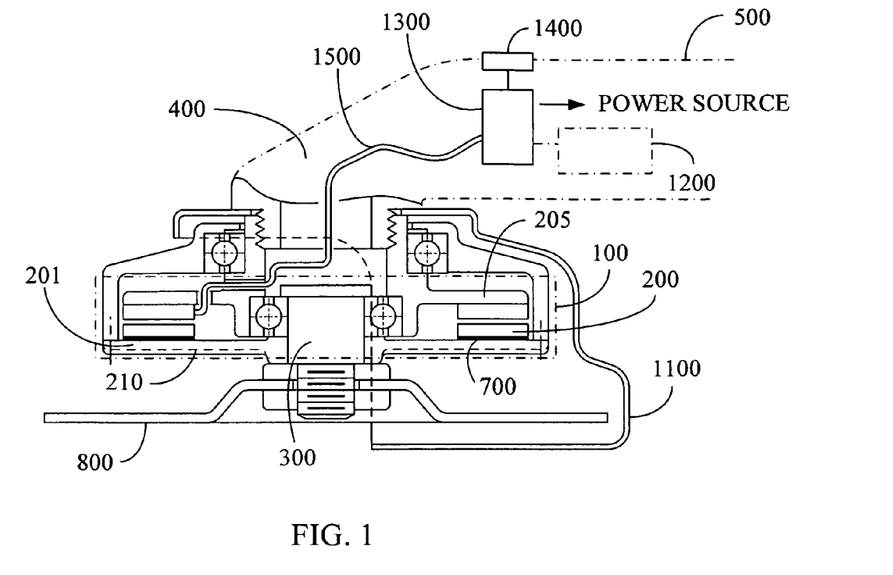
FIG. 1 is a structural drawing showing the main components of the direct motor-drive portable angle grinder of the present invention

The present invention is an original direct motor-drive portable angle grinder with a disc type motor installed in a position adjacent to the grinding wheel and an outer motor rotating part coaxially and directly driving the grinding wheel or the circular saw. By means of the direct drive, the present invention prevents the emission of noise made by angle type transmission devices. Moreover, an inertial body is installed on the rotating housing that is integrated with the rotating part to form a flywheel or the rotating housing and the inertial body are integrated into a single reinforced structure to enable a flywheel function in order to improve the grinding, polishing and machining or cutting abilities of the grinding wheel or the circular saw. Aside from a manually controlled electromechanical device, a power storing and discharging device is also installed in the handle for use as a power source. FIG. 1 is a structural drawing showing the main components of the present invention. The structural pattern of the outer rotating motor direct drive portable angle grinder in FIG. 1 is formed by the coaxial drive of the outer rotating part of the drive motor and the housing on the grinding wheel. The main components include:

Drive motor (100): Consists of alternating or direct current, brush or brushless, synchronous or asynchronous of outer rotating electric motor, including cylindrical, conical or disc type motor static and motor rotating parts (200) that are, directly or indirectly through the insulation (700), integrated with the rotating housing (201) of the motor to enable the outer rotating motor part to make high speed and high inertial rotary drive to facilitate grinding, polishing and cutting of workpieces of the grinding wheel (800) or the circular saw and heat dissipation. The grinding wheel (800) is coaxially installed with the spindle (300) of the motor rotating part (200).

Housing (400): A structure formed by solid state material for the installation of the drive motor (100) and a handle (500) formed by an extended body or assembly. Its features are the drive motor (100) is installed in the housing (400); the deflection angle between the axis of the spindle (300) of the drive motor (100) of the rotating part (200) and the axis of the handle (500) is between 30°-150°.

Handle (500): A hollow body for the installation of one or more of the following circuit devices including power cord (1500), manually operated electromechanical device (1400), power storing and discharging device (1200), and optional devices like control circuit (1300), or indicator lamp, and display devices for the operational control of the direct motor-drive portable angle grinder.

Manually operated electromechanical device (1400): An interface that directly or by way of the control circuit (1300) provide the operator with the control over the direct motor-drive portable angle grinder; and formed by electromechanical or solid state electronic structures for turning the motor on or off, and/or changing the rotational speed and/or varying the speed.

Control circuit (1300): Provide operational capability for the execution of turning the motor on and off and/or changing the rotational speed and/or varying the speed; and/or for the control and protection of voltage and current.

Grinding wheel (800): Installed on the spindle (300) of the motor rotating part (200) to provide rotary drive operation for grinding, polishing and cutting workpieces.

Guard (1100): installed on one side of the grinding wheel (800) and the rotating part (200) adjacent to the handle.

Figure 2:
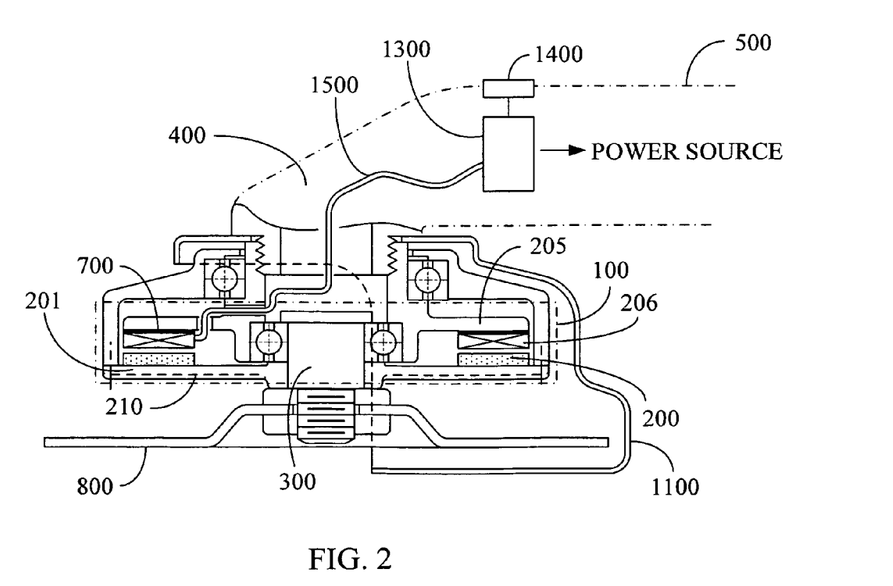
FIG. 2 is the first operational diagram of the present invention showing the drive motor rotating part and housing coaxially driving the grinding wheel
Figure 3:
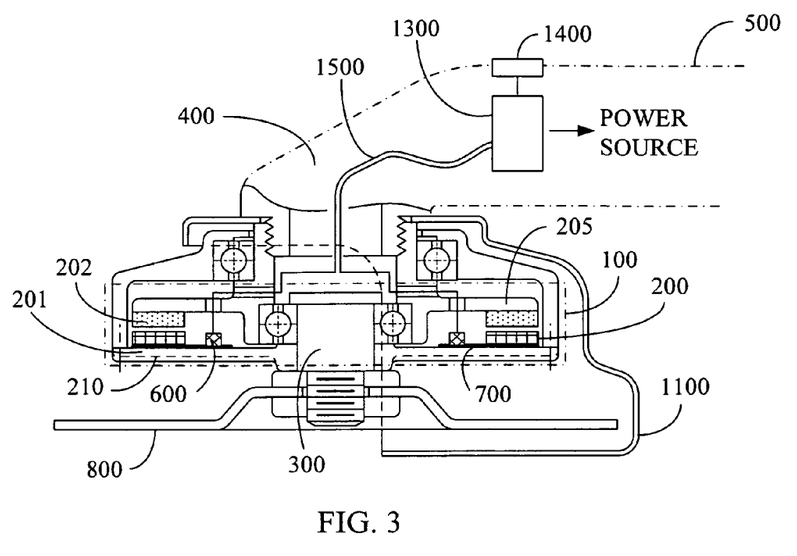
FIG. 3 is the second operational diagram of the present invention
Figure 4:
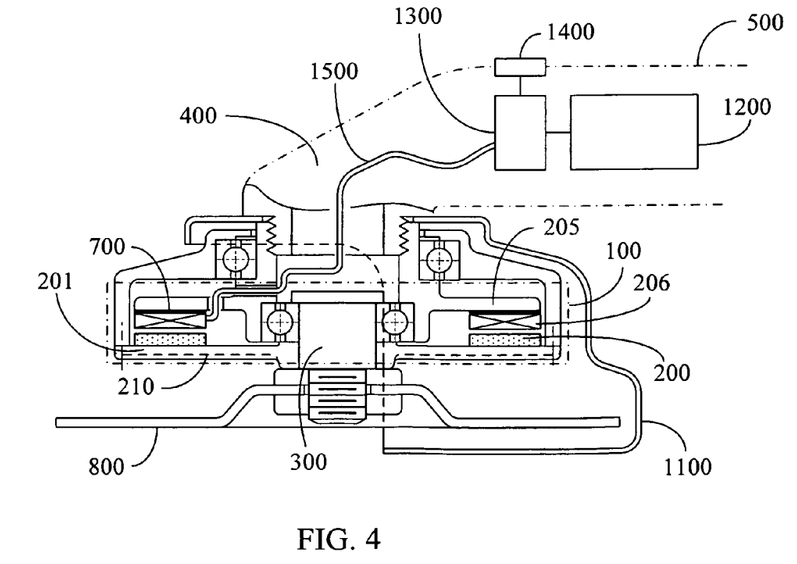
FIG. 4 is the third operational diagram of the present invention
Figure 5:
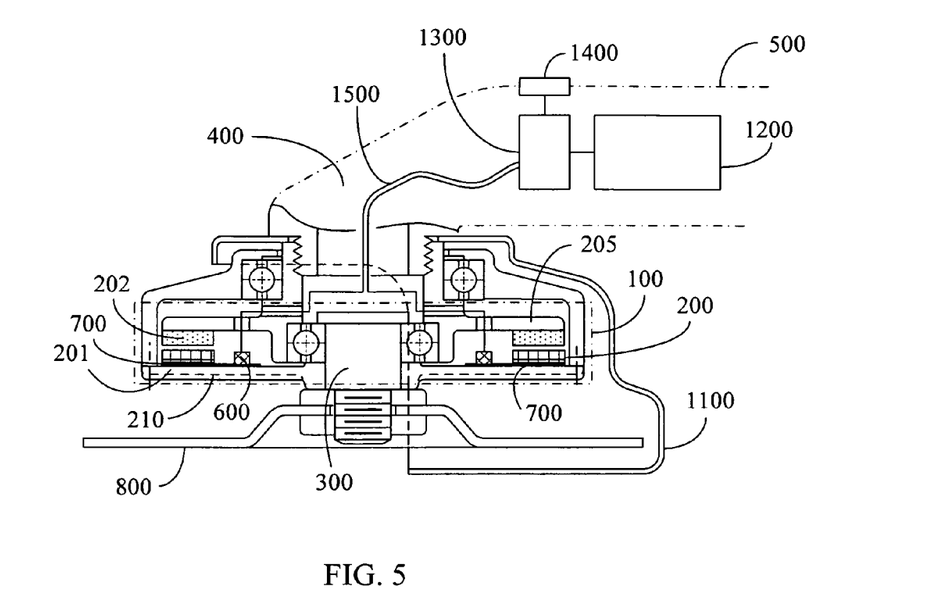
FIG. 5 is the fourth operational diagram of the present invention

The following operational diagrams of the direct motor-drive portable angle grinder in FIG. 1 are drawn according to the choices of motors used which include:

FIG. 2 is the first operational diagram of the present invention;

FIG. 3 is the second operational diagram of the present invention;

FIG. 4 is the third operational diagram of the present invention;

FIG. 5 is the fourth operational diagram of the present invention;

FIG. 2 is the first operational diagram of the present invention showing the motor rotating part and housing coaxially driving the grinding wheel. The operational electric motor is of the brushless type using city mains as its power source. The main components include:

Drive motor (100): Consists of alternating or direct current, brushless of synchronous or asynchronous outer rotating electric motor, including cylindrical, conical or disc type motor static and motor rotating parts (200) that are, directly or indirectly through the insulation (700), integrated with the rotating housing (201) of the motor to enable the outer motor rotating part to make high speed and high inertial rotary drive to facilitate grinding, polishing and cutting of workpieces of the grinding wheel (800) or the circular saw and heat dissipation. The grinding wheel (800) is coaxially installed with the spindle (300) of the motor rotating part (200).

Housing (400): A structure formed by solid state material for the installation of the drive motor (100) and a handle (500) formed by an extended body or assembly. Its features are the drive motor (100) is installed in the housing (400); the deflection angle between the axis of the spindle (300) of the drive motor (100) of the rotating part (200) and the axis of the handle (500) is between 30°-150°.

Handle (500): A hollow body for the installation of one or more of the following circuit devices including power cord (1500), manually operated electromechanical device (1400), power storing and discharging device (1200), and optional devices like control circuit (1300), or indicator lamp, and display devices for the operational control of the direct motor-drive portable angle grinder.

Manually operated electromechanical device (1400): An interface that directly or by way of the control circuit (1300) provide the operator with the control over the direct motor-drive portable angle grinder; and formed by electromechanical or solid state electronic structures for turning the motor on or off, and/or changing the rotational speed and/or varying the speed.

Control circuit (1300): Provide operational capability for the execution of turning the motor on and off and/or changing the rotational speed and/or varying the speed; and/or for the control and protection of voltage and current.

Grinding wheel (800): Installed on the spindle (300) of the motor rotating part (200) to provide rotary drive operation for grinding, polishing and cutting workpieces.

Guard (1100): installed on one side of the grinding wheel (800) and the rotating part (200) adjacent to the handle Thereinto: The motor rotating part (200) is snugly installed inside the driven rotating housing (201) to enable the outer motor rotating part to make high speed and high inertial rotary drive in order to facilitate grinding, polishing and cutting operations of the grinder and for heat dissipation of motor. The grinding wheel (800) is coaxially installed on the spindle (300) of the motor rotating part (200). The motor winding (206) is installed on the motor static part (205) through the insulation (700).

FIG. 3 is the second operational diagram of the present invention showing the deployment of commutator type outer motor as the driving motor in FIG. 1. The motor rotating part (200) is consisted of an armature with electric energy supplied through the electric brush (600).

The main components are:

Drive motor (100): Consists of alternating or direct current, commutator type brush of outer rotating electric motor, including cylindrical, conical or disc type permanent magnet or coil-wound type field-exciting commutator type motor magnetic field structure (202) and armature-formed motor rotating part (200) with power supplied by the electric brush (600). Directly or through the insulation (700), the motor rotating part (200) is integrated with the rotating housing (201) of the motor to enable the outer motor rotating part to make high speed and high inertial rotary drive to facilitate grinding, polishing and cutting of workpieces of the grinding wheel (800) or the circular saw and heat dissipation. The grinding wheel (800) is coaxially installed on the spindle (300) of the motor rotating part (200).

Housing (400): A structure formed by solid state material for the installation of the drive motor (100) and a handle (500) formed by an extended body or assembly. Its features are the drive motor (100) is installed in the housing (400); the deflection angle between the axis of the spindle (300) of the drive motor (100) of the rotating part (200) and the axis of the handle (500) is between 30°-150°.

Handle (500): A hollow body for the installation of one or more of the following circuit devices including power cord (1500), manually operated electromechanical device (1400) and optional devices like control circuit (1300), or indicator lamp, and display devices for the operational control of the direct motor-drive portable angle grinder.

Manually operated electromechanical device (1400): An interface that directly or by way of the control circuit (1300) provide the operator with the control over the direct motor-drive portable angle grinder; and formed by electromechanical or solid state electronic structures for turning the motor on or off, and/or changing the rotational speed and/or varying the speed.

Control circuit (1300): Provide operational capability for the execution of turning the motor on and off and/or changing the rotational speed and/or varying the speed; and/or for the control and protection of voltage and current.

Grinding wheel (800): Installed on the spindle (300) of the motor rotating part (200) to provide rotary drive operation for grinding, polishing and cutting workpieces.

Guard (1100): installed on one side of the grinding wheel (800) and the rotating part (200) adjacent to the handle Thereinto: The motor rotating part (200) is snugly installed inside the driven rotating housing (201) directly or through the insulation 700 to enable the outer motor rotating part to make high speed and high inertial rotary drive in order to facilitate grinding, polishing and cutting operations of the grinder and for heat dissipation of motor. The grinding wheel (800) is coaxially installed with the spindle (300) of the motor rotating part (200).

FIG. 4 is the third operational diagram of the present invention showing the installation of the power storing and discharging device (1200) and the manually operated electromechanical device (1400) in the handle (500) in FIG. 2.

The main components include:

Drive motor (100): Consists of alternating or direct current, brushless of synchronous or asynchronous outer rotating electric motor, including cylindrical, conical or disc type motor static and motor rotating parts (200). Directly or through the insulation (700), the motor rotating part (200) is integrated with the rotating housing (201) of the motor to enable the outer motor rotating part to make high speed and high inertial rotary drive to facilitate grinding, polishing and cutting of workpieces of the grinding wheel (800) or the circular saw and heat dissipation. The grinding wheel (800) is coaxially installed with the spindle (300) of the motor rotating part (200).

Housing (400): A structure formed by solid state material for the installation of the drive motor (100) and a handle (500) formed by an extended body or assembly. Its features are the drive motor (100) is installed in the housing (400); the deflection angle between the axis of the spindle (300) of the drive motor (100) of the rotating part (200) and the axis of the handle (500) is between 30°-150°.

Handle (500): A hollow body for the installation of one or more of the following circuit devices including power cord (1500), manually operated electromechanical device (1400), power storing and discharging device (1200) and optional devices like control circuit (1300), or indicator lamp, and display devices for the operational control of the direct motor-drive portable angle grinder.

Manually operated electromechanical device (1400): An interface that directly or by way of the control circuit (1300) provide the operator with the control over the direct motor-drive portable angle grinder; and formed by electromechanical or solid state electronic structures for turning the motor on or off, and/or changing the rotational speed and/or varying the speed.

Control circuit (1300): Provide operational capability for the execution of turning the motor on and off and/or changing the rotational speed and/or varying the speed; and/or for the control and protection of voltage and current.

Grinding wheel (800): Installed on the spindle (300) of the motor rotating part (200) to provide rotary drive operation for grinding, polishing and cutting workpieces.

Guard (1100): installed on one side of the grinding wheel (800) and the rotating part (200) adjacent to the handle Thereinto: The motor rotating part (200) is snugly installed inside the driven rotating housing (201) to enable the outer motor rotating part to make high speed and high inertial rotary drive in order to facilitate grinding, polishing and cutting operations of the grinder and for heat dissipation of motor. The grinding wheel (800) is coaxially installed with the spindle (300) of the motor rotating part (200).

FIG. 5 is the fourth operational diagram of the present invention showing the installation of the power storing and discharging device (1200) and the manually operated electromechanical device (1400) in the handle (500) in FIG. 3.

The main components are:

Drive motor (100): Consists of alternating or direct current commutator type brush of outer rotating electric motor, including cylindrical, conical or disc type permanent magnet or coil-wound type field-exciting commutator type motor magnetic field structure (202) and the motor rotating part (200). Directly or through the insulation (700), the motor rotating part (200) is integrated with the rotating housing (201) of the motor to enable the outer motor rotating part to make high speed and high inertial rotary drive to facilitate grinding, polishing and cutting of workpieces of the grinding wheel (800) or the circular saw and heat dissipation. The grinding wheel (800) is coaxially installed on the spindle (300) of the motor rotating part (200).

Housing (400): A structure formed by solid state material for the installation of the drive motor (100) and a handle (500) formed by an extended body or assembly. Its features are the drive motor (100) is installed in the housing (400); the deflection angle between the axis of the spindle (300) of the drive motor (100) of the rotating part (200) and the axis of the handle (500) is between 30°-150°.

Handle (500): A hollow body for the installation of one or more of the following circuit devices including power cord (1500), manually operated electromechanical device (1400), power storing and discharging device (1200) and optional devices like control circuit (1300), or indicator lamp, and display devices for the operational control of the direct motor-drive portable angle grinder.

Manually operated electromechanical device (1400): An interface that directly or by way of the control circuit (1300) provide the operator with the control over the direct motor-drive portable angle grinder; and formed by electromechanical or solid state electronic structures for turning the motor on or off, and/or changing the rotational speed and/or varying the speed.

Control circuit (1300): Provide operational capability for the execution of turning the motor on and off and/or changing the rotational speed and/or varying the speed; and/or for the control and protection of voltage and current.

Grinding wheel (800): Installed on the spindle (300) of the motor rotating part (200) to provide rotary drive operation for grinding, polishing and cutting workpieces.

Guard (1100): installed on one side of the grinding wheel (800) and the rotating part (200) adjacent to the handle.

The grinding, polishing or cutting abilities of the grinder are improved by the present invention of a direct motor-drive portable angle grinder. Furthermore, an additional drive motor (100) is installed on the housing driven by the motor rotating part (200) or the motor rotating part (200) and the drive motor (100) are made into one integrated body in order to increase the inertial mass.

Figure 6:
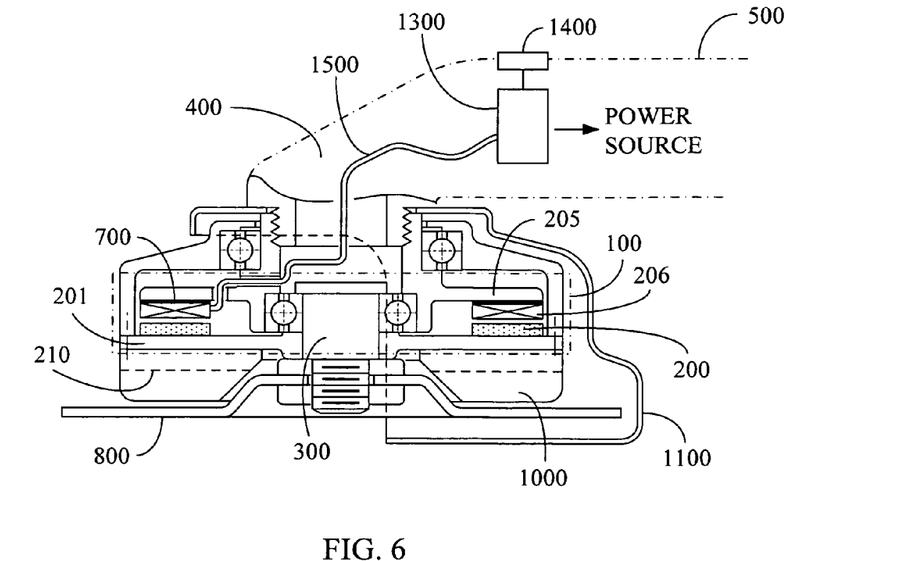
FIG. 6 is the operational view of the present invention showing the additional installation of an inertial flywheel in FIG. 2

FIG. 6 is the operational diagram of the present invention showing the additional installation of an inertial flywheel in FIG. 2.

Aside from showing the structures in FIG. 2, FIG. 6 also shows the installation of a inertial body (1000) around the motor rotating part (200) and the grinding wheel (800) that enables the high inertial mass outer motor rotating part to make high speed and high inertia rotary drive in order to facilitate the workpiece grinding, polishing or cutting operations of the grinder and dissipating heat of the motor. The spindle (300) of the motor rotating part (200) is coaxially installed with the grinding wheel (800).

Figure 7:
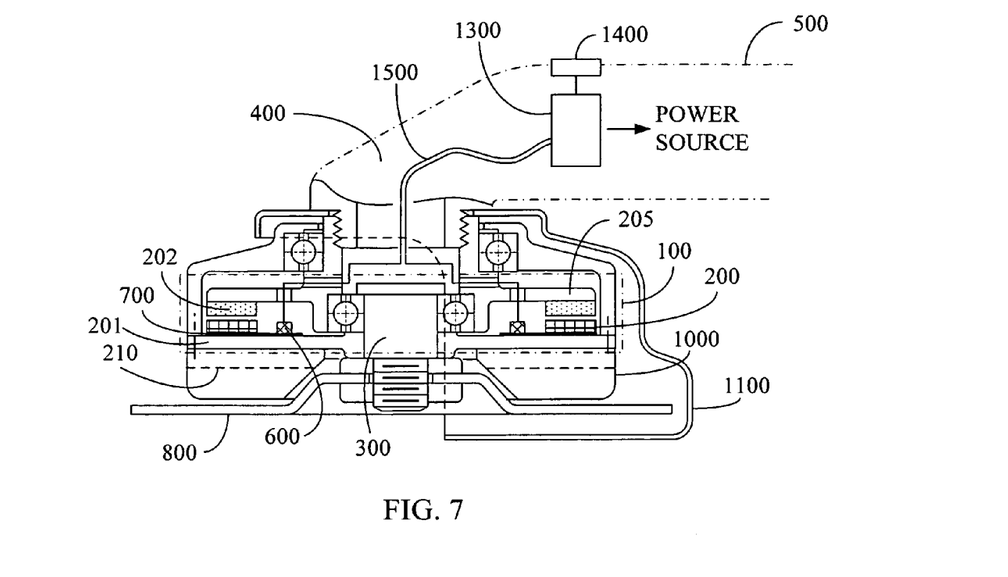
FIG. 7 is the operational diagram of the present invention showing the additional installation of an inertial flywheel in FIG. 3

FIG. 7 is the operational diagram of the present invention showing the additional installation of an inertial flywheel in FIG. 3.

Aside from showing the structures in FIG. 3, FIG. 7 also shows the installation of a inertial body (1000) around the motor rotating part (200) and the grinding wheel (800) that enables the high inertial mass outer motor rotating part to make high speed and high inertia rotary drive in order to facilitate the workpiece grinding, polishing or cutting operations of the grinding wheel (800) or the circular saw and dissipating heat of the motor. The spindle (300) of the motor rotating part (200) is coaxially installed with the grinding wheel (800).

Figure 8:
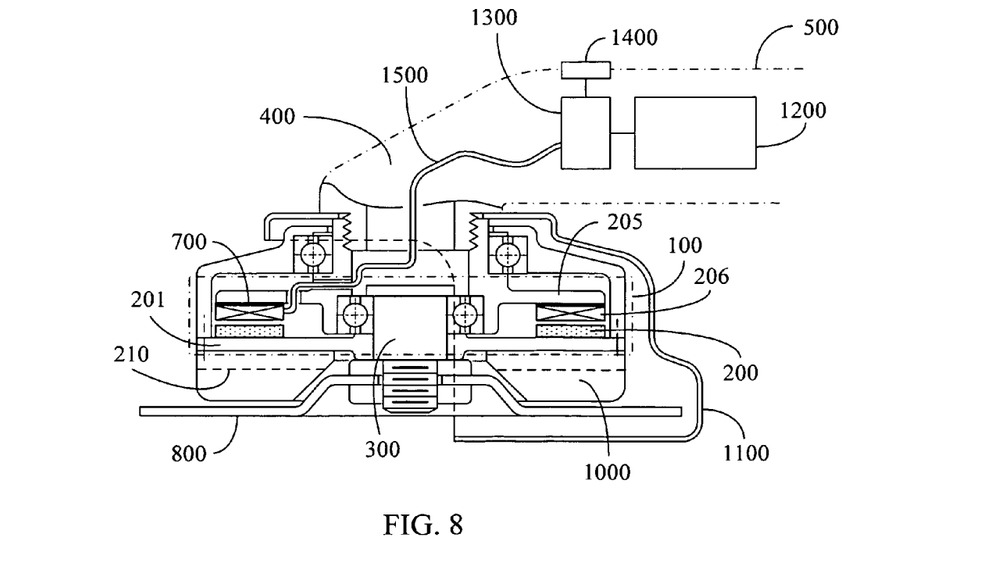
FIG. 8 is the operational diagram of the present invention showing the additional installation of an inertial flywheel in FIG. 4

FIG. 8 is the operational diagram of the present invention showing the additional installation of an inertial flywheel in FIG. 4.

Aside from showing the structures in FIG. 4, FIG. 8 also shows the installation of a inertial body (1000) around the motor rotating part (200) and the grinding wheel (800) that enables the high inertial mass outer motor rotating part to make high speed and high inertia rotary drive in order to facilitate the workpiece grinding, polishing or cutting operations of the grinding wheel (800) or the circular saw and dissipating heat of the motor. The spindle (300) of the motor rotating part (200) is coaxially installed with the grinding wheel (800).

Figure 9:
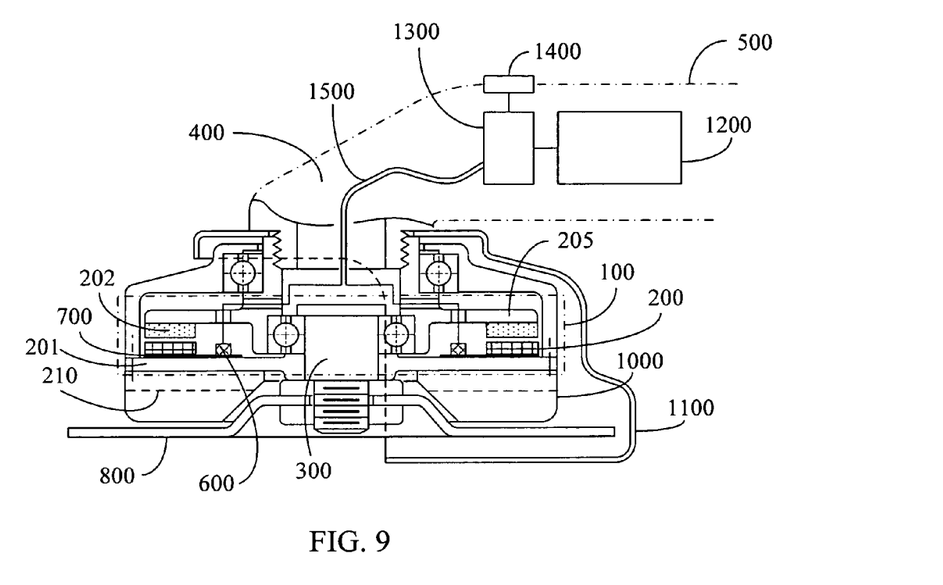
FIG. 9 is the operational diagram of the present invention showing the additional installation of an inertial flywheel in FIG. 5

FIG. 9 is the operational diagram of the present invention showing the additional installation of an inertial body in FIG. 5.

Aside from showing the structures in FIG. 5, FIG. 9 also shows the installation of a inertial body (1000) around the motor rotating part (200) and the grinding wheel (800) that enables the high inertial mass outer motor rotating part to make high speed and high inertia rotary drive in order to facilitate the workpiece grinding, polishing or cutting operations of the grinding wheel (800) or the circular saw and dissipating heat of the motor. The spindle (300) of the motor rotating part (200) is coaxially installed with the grinding wheel (800).

The outer motor rotating housing (201) and the inertial body (1000) of the present invention of a direct motor-drive portable angle grinder are further made into a fin structure (210) in order to improve heat dissipation during rotation.

Figure 10:
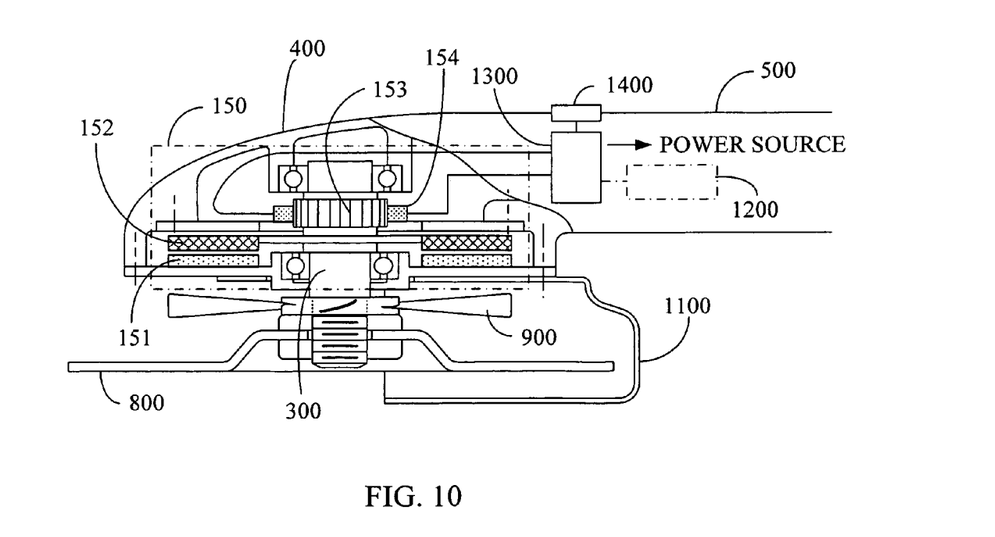
FIG. 10 is the first operational diagram of the commutator-type motor formed together by the housing and the internal rotation type motor of the present invention

Furthermore, the present invention is formed by internal rotation type flat, disc or relatively short cylindrical alternating current or direct current commutator-type motors. The internal rotation type flat, disc or relatively short cylindrical electric motors are for reducing workspace disruption, and to give the drive motor a better heat dissipation environment;

Its structural mode is the following:

As shown in the first operational diagram of the commutator-type motor formed together by the housing and the internal rotation type motor of the present invention in FIG. 10;

The main components are the following:

Commutator-type drive motor (150): Formed by alternating current or direct current commutator-type drive motor (150) in flat, disc or relatively short cylindrical forms including motor rotating part (152) with static part (151) and commutator (153), and brush assembly (154); wherein the static part (151) and the spindle (300) of the motor rotating part (152) and one end of the bearing are directly installed on the housing (400); the other externally exposed end of the spindle (300) of the rotating part (152) of the internal rotation commutator-type drive motor (150) is for coaxial installation of the grinding wheel (800) or the circular saw for workpiece polishing, grinding and cutting operations of the grinding wheel (800) or the circular saw which are driven by the internal rotation type motor rotating part (152);

Housing (400): A structure formed by solid state material for the installation of the commutator-type drive motor (150) and a handle (500) formed by an extended body or assembly. The static part (151) and the spindle (300) of the rotating part (152) of the commutator-type drive motor (150) and one end of the bearing combine with the housing (400). The deflection angle between the axis of the spindle (300) of the rotating part (152) of the commutator-type drive motor (150) and the axis of the handle (500) is between 30°-150°;

Handle (500): A hollow body for the installation of one or more of the following circuit devices including power cord (1500), manually operated electromechanical device (1400), power storing and discharging device (1200) and optional devices like control circuit (1300), or indicator lamp, and display devices for the operational control of the direct commutator-type drive motor (150)-driven portable angle grinder;

Manually operated electromechanical device (1400): An interface that directly or by way of the control circuit (1300) provide the operator with the control over the direct commutator-type drive motor (150)-driven portable angle grinder; and formed by electromechanical or solid state electronic structures for turning the motor on or off, and/or changing the rotational speed and/or varying the speed;

Control circuit (1300): Provide operational capability for the execution of turning the commutator-type drive motor (150) on and off and/or changing the rotational speed and/or varying the speed; and/or for the control and protection of voltage and current;

Grinding wheel (800): Installed on the spindle (300) of the motor rotating part (152) to provide rotary drive operation for grinding, polishing and cutting workpieces;

Blade (900): Installed between the grinding wheel (800) and the housing of the commutator-type drive motor (150) in order to facilitate heat dissipation;

Guard (1100): installed on one side of the grinding wheel (800) and the motor rotating part (152) adjacent to the handle.

The features of the guard lie in its combination with the static part of the commutator-type drive motor (150) through the housing (400), and to serve as another bearing side support of the spindle (300) that drives the internal rotation type motor rotating part (152). Moreover, it allows the interiors of both the commutator-type drive motor (150) and the housing (400) to become an open and interconnecting structure so that the accumulated heat inside a running commutator-type drive motor (150) may flow smoothly between the housing (400) and the motor interior in order to facilitate heat dissipation. In addition, blades (900) are installed on the spindle (300) between the grinding wheel (800) and the housing exterior of the commutator-type drive motor (150) to move air flow outwardly for better motor heat dissipation.

Figure 11:
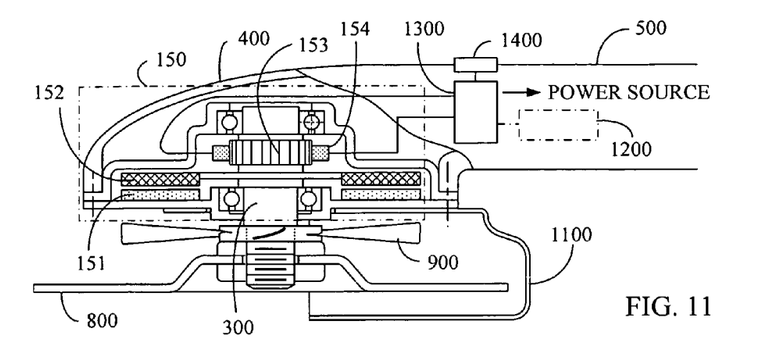
FIG. 11 is the second operational diagram of the commutator-type motor formed together by the housing and the internal rotation type motor of the present invention

FIG. 11 is second operational diagram of the commutator-type motor formed together by the housing and the internal rotation type motor of the present invention;

The main components are the following:

Commutator-type drive motor (150): Formed by alternating current or direct current Commutator-type drive motor (150) in flat, disc or relatively short cylindrical forms including motor rotating part (152) with static part (151) and commutator (153), and brush assembly (154); wherein the static part (151) is directly installed on the housing (400); the other externally exposed end of the spindle (300) of the internal rotation type motor rotating part (152) is provided for the coaxial installation of the grinding wheel (800) or the circular saw for workpiece polishing, grinding and cutting operations of the grinding wheel (800) or the circular saw which are driven by the internal rotation type motor rotating part (152);

Housing (400): A structure formed by solid state material for the installation of the commutator-type drive motor (150) and a handle (500) formed by an extended body or assembly. The static part (151) of the commutator-type drive motor (150) combines with the housing (400). The deflection angle between the axis of the spindle (300) of the rotating part (152) of the commutator-type drive motor (150), and the axis of the handle (500) is between 30°-150°;

Handle (500): A hollow body for the installation of one or more of the following circuit devices including power cord (1500), manually operated electromechanical device (1400), power storing and discharging device (1200) and optional devices like control circuit (1300), or indicator lamp, and display devices for the operational control of the direct commutator-type drive motor (150)-driven portable angle grinder;

Manually operated electromechanical device (1400): An interface that directly or by way of the control circuit (1300) provide the operator with the control over the direct commutator-type drive motor (150)-driven portable angle grinder; and formed by electromechanical or solid state electronic structures for turning the motor on or off, and/or changing the rotational speed and/or varying the speed;

Control circuit (1300): Provide operational capability for the execution of turning the commutator-type drive motor (150) on and off and/or changing the rotational speed and/or varying the speed; and/or for the control and protection of voltage and current;

Grinding wheel (800): Installed on the spindle (300) of the motor rotating part (152) to provide rotary drive operation for grinding, polishing and cutting workpieces;

Blade (900): Installed between the grinding wheel (800) and the housing of the commutator-type drive motor (150) in order to facilitate heat dissipation;

Guard (1100): installed on one side of the grinding wheel (800) and the motor rotating part (152) adjacent to the handle;

Its features lie in its combination with the static part of the commutator-type drive motor (150) through the housing (400), and the installation of blades (900) on the spindle (300) between the grinding wheel (800) and the housing exterior of the commutator-type drive motor (150) to move air flow outwardly for better motor heat dissipation.

Furthermore, vents (250) are installed on the housing of the commutator-type drive motor (150) inside the housing (400) of the aforementioned commutator-type drive motor (150) in FIG. 11 in order to facilitate interflow of the accumulated heat of the commutator-type drive motor (150) in the housing (400) space; and from the housing (400), heat is then dissipated outside.

Figure 12:
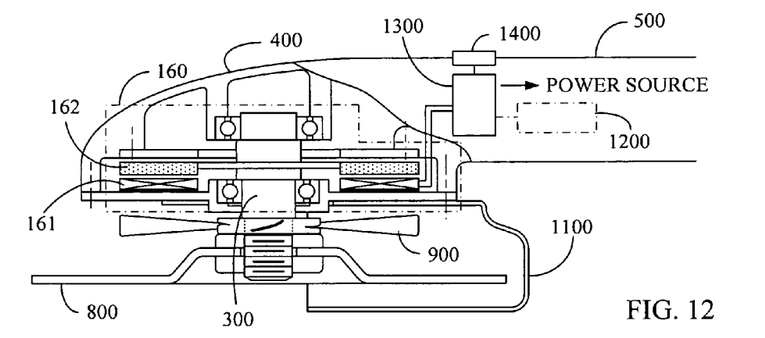
FIG. 12 is the first operational diagram of the structure formed together by the housing and the internal rotation type brushless motor of the present invention

Furthermore, the present invention is formed by internal rotation type flat, disc or relatively short cylindrical alternating current or direct current synchronous or asynchronous brushless motors. The internal rotation type flat, disc or relatively short cylindrical electric motors are for reducing workspace disruption, and to give the drive motor a better heat dissipation environment;

FIG. 12 is the first operational diagram of the structure formed together by the housing and the internal rotation type brushless motor of the present invention;

Its structural mode is the following:

Brushless motor (160): Formed by alternating current or direct current brushless motor in flat, disc or relatively short cylindrical forms including static part (161) and motor rotating part (162); wherein the static part (161) and the spindle (300) of the motor rotating part (162) and one end of the bearing are directly installed on the housing (400); the other externally exposed end of the spindle (300) of the rotating part (152) of the internal rotation type brushless motor is for coaxial installation of the grinding wheel (800) or the circular saw for workpiece polishing, grinding and cutting operations of the grinding wheel (800) or the circular saw which are driven by the internal rotation type motor rotating part (162);

Housing (400): A structure formed by solid state material for the installation of the brushless motor (160) and a handle (500) formed by an extended body or assembly. The static part (161) and the spindle (300) of the rotating part (162) of the brushless motor (160) and one end of the bearing combine with the housing (400). The deflection angle between the axis of the spindle (300) of the rotating part (162) of the brushless motor (160), and the axis of the handle (500) is between 30°-150°;

Handle (500): A hollow body for the installation of one or more of the following circuit devices including power cord (1500), manually operated electromechanical device (1400), power storing and discharging device (1200) and optional devices like control circuit (1300), or indicator lamp, and display devices for the operational control of the direct brushless motor (160)-driven portable angle grinder;

Manually operated electromechanical device (1400): An interface that directly or by way of the control circuit (1300) provide the operator with the control over the direct brushless motor (160)-driven portable angle grinder; and formed by electromechanical or solid state electronic structures for turning the motor on or off, and/or changing the rotational speed and/or varying the speed;

Control circuit (1300): Provide operational capability for the execution of turning the brushless motor (160) on and off and/or changing the rotational speed and/or varying the speed; and/or for the control and protection of voltage and current;

Grinding wheel (800): Installed on the spindle (300) of the rotating part (162) of the brushless motor (160) to provide rotary drive operation for grinding, polishing and cutting workpieces;

Blade (900): Installed between the grinding wheel (800) and the housing of the brushless motor (160) in order to facilitate heat dissipation;

Guard (1100): installed on one side of the grinding wheel (800) and the motor rotating part (162) adjacent to the handle.

The features of the guard lie in its combination with the static part of the brushless motor (160) through the housing (400), and to serve as another bearing side support of the spindle (300) that drives rotating part (162) of the internal rotation type brushless motor. Moreover, it allows the interiors of both the brushless motor (160) and the housing (400) to become an open and interconnecting structure so that the accumulated heat inside a running brushless motor (160) may flow smoothly between the housing (400) and the motor interior in order to facilitate heat dissipation. In addition, blades (900) are installed on the spindle (300) between the grinding wheel (800) and the housing exterior of the brushless motor (160) to move air flow outwardly for better motor heat dissipation.

Figure 13:
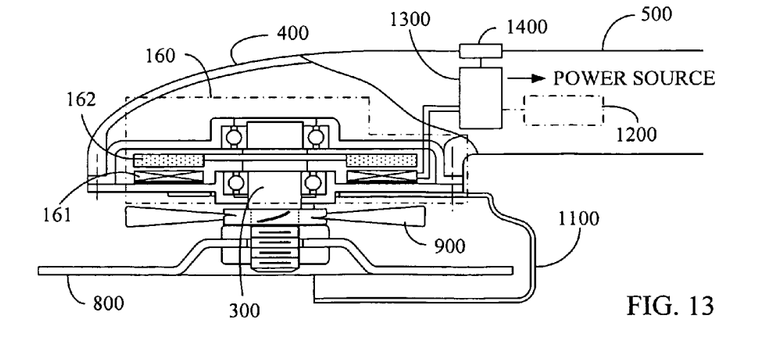
FIG. 13 is the second operational diagram of the structure formed together by the housing and the internal rotation type brushless motor

FIG. 13 is the second operational diagram of the structure formed together by the housing and the internal rotation type brushless motor;

Its structural mode is the following:

Brushless motor (160): Formed by alternating current or direct current brushless motor in flat, disc or relatively short cylindrical forms including static part (161) and motor rotating part (162); wherein the static part (161) is directly installed on the housing (400); the externally exposed end of the spindle (300) of the rotating part (162) of the internal rotation type brushless motor (160) is provided for the coaxial installation of the grinding wheel (800) or the circular saw for workpiece polishing, grinding and cutting operations of the grinding wheel (800) or the circular saw which are driven by the internal rotation type motor rotating part (162);

Housing (400): A structure formed by solid state material for the installation of the brushless motor (160) and a handle (500) formed by an extended body or assembly. The static part (161) of the brushless motor (160) combines with the housing (400). The deflection angle between the axis of the spindle (300) of the rotating part (162) of the brushless motor (160), and the axis of the handle (500) is between 30°-150°;

Handle (500): A hollow body for the installation of one or more of the following circuit devices including power cord (1500), manually operated electromechanical device (1400), power storing and discharging device (1200) and optional devices like control circuit (1300), or indicator lamp, and display devices for the operational control of the direct brushless motor (160)-driven portable angle grinder;

Manually operated electromechanical device (1400): An interface that directly or by way of the control circuit (1300) provide the operator with the control over the direct brushless motor (160)-driven portable angle grinder; and formed by electromechanical or solid state electronic structures for turning the motor on or off, and/or changing the rotational speed and/or varying the speed;

Control circuit (1300): Provide operational capability for the execution of turning the brushless motor (160) on and off and/or changing the rotational speed and/or varying the speed; and/or for the control and protection of voltage and current;

Grinding wheel (800): Installed on the spindle (300) of the rotating part (162) of the brushless motor (160) to provide rotary drive operation for grinding, polishing and cutting workpieces;

Blade (900): Installed between the grinding wheel (800) and the housing of the brushless motor (160) in order to facilitate heat dissipation;

Guard (1100): installed on one side of the grinding wheel (800) and the motor rotating part (162) adjacent to the handle.

Its features lie in its combination with the static part of the brushless motor (160) through the housing (400), and the installation of blades (900) on the spindle (300) between the grinding wheel (800) and the housing exterior of the brushless motor (160) to move air flow outwardly for better motor heat dissipation.

Furthermore, vents (250) are installed on the housing of the brushless motor (160) inside the housing (400) of the aforementioned brushless motor (160) in FIG. 13 in order to facilitate interflow of the accumulated heat of the brushless motor (160) in the housing (400) space; and from the housing (400), heat is then dissipated outside.

The invention claimed is:

1. A direct motor-driven tool, comprising:
a drive motor having a rotor, a stator, a fixed outer housing part that encloses the drive motor, and a spindle extending from the rotor;

a handle integrated with the outer housing part, wherein an angle between an axis of the handle and an axis of the spindle is between 30° and 150°;

one of a grinding wheel and a circular saw fixed to the spindle so as to rotate with the spindle and be directly driven by the drive motor; and blades on the spindle installed between the grinding wheel and an exterior of the outer housing part for improved motor heat dissipation, wherein said fixed outer housing part and handle provide an interconnected and open housing structure for improved air flow from said blades to cool said motor.

2. A direct motor-driven tool as claimed in claim 1, wherein said motor is a commutator type motor having brushes fixed to the outer housing part.

3. A direct motor-driven tool as claimed in claim 1, wherein said outer housing part further supports a stator winding.

4. A direct motor-driven tool as claimed in claim 1, wherein the handle is a hollow body.

5. A direct motor-driven tool as claimed in claim 4, wherein the handle contains a manually-operated electromechanical control device for the drive motor and a power storing and discharging device for supplying power to the drive motor through a power cable to cause the spindle to rotate.

6. A direct motor-driven tool as claimed in claim 5, wherein the handle further contains a control circuit for performing one or more motor control functions including turning the motor on and off, changing a rotational speed, or control and protection of voltage and current.

7. A direct motor-driven tool as claimed in claim 6, wherein the motor control functions include at least one of the following functions: turning the motor on and off, changing or varying a rotational speed, and control and protection of voltage and current.

8. A direct motor-driven tool as claimed in claim 5, wherein the manually operated electromechanical device is an interface that directly or by way of a control circuit provides an operator with control over the direct motor-driven tool; said electromechanical device being arranged to enable the operator to turn the motor on and off, and/or change or vary a speed of the drive motor.

9. A direct motor-driven tool as claimed in claim 1, wherein power to the drive motor is supplied by a power cord connected to an external power source.

10. A direct motor-driven tool as claimed in claim 1, wherein the power source includes a power storing and discharging device.

11. A direct motor-driven tool as claimed in claim 1, wherein the stator and the spindle are directly installed on the housing.

12. A direct motor-driven tool as claimed in claim 1, wherein the stator is directly installed on the housing.

13. A direct motor-driven tool as claimed in claim 1, wherein said drive motor is a brushless motor.

14. A direct motor-driven tool as claimed in claim 1, further comprising a guard installed on one side of the grinding wheel and the rotor adjacent to the handle.

15. A direct motor-driven tool as claimed in claim 1, wherein the drive-motor is disc-shaped.

* * * * *